(12) United States Patent
Ejiri (10) Patent No.: US 6,262,990 B1
(45) Date of Patent: Jul. 17, 2001

(54) FIXED LENGTH PACKET MULTIPLEXER OF UNIVERSAL DATA WITH BURST CHARACTERISTIC AT LOW SPEED

(75) Inventor: Satoru Ejiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,965

(22) Filed: Dec. 1, 1998

(30) Foreign Application Priority Data

Dec. 1, 1997 (JP) .................................................... 9-330245

(51) Int. Cl.<sup>7</sup> ................................. H04L 12/56; H04J 3/02
(52) U.S. Cl. ........................... 370/412; 370/468; 370/537
(58) Field of Search ................................... 370/473, 474, 370/465, 468, 537, 538, 252, 253, 412, 391; 348/423

(56) References Cited

U.S. PATENT DOCUMENTS

| | | | |
|---|---|---|---|
| 5,138,440 | * 8/1992 | Radice | 358/13 |
| 5,506,903 | * 4/1996 | Yamashita | 380/19 |
| 5,550,589 | * 8/1996 | Shiojiri et al. | 348/387 |
| 6,009,108 | * 12/1999 | Takehara et al. | 370/538 |
| 6,047,000 | * 4/2000 | Tsang et al. | 370/412 |
| 6,088,360 | * 6/2000 | Amaral et al. | 370/412 |

* cited by examiner

Primary Examiner—Chau Nguyen
Assistant Examiner—Soon-Dong Hyun
(74) Attorney, Agent, or Firm—Ostrolenk, Faber, Gerb & Soffen, LLP (57) ABSTRACT

A fixed length packet multiplexer of low speed universal data having a burst characteristic of different data with different speeds and large speed differences to reduce a transmission delay. In a packet processor, a packet formable time (release timing) is not determined to the time when a predetermined length of payload data are stored in a multiplex buffer like the conventional case. But, a periodic release timing is voluntarily given to a multiplex part from a time generator, and the universal data stored in a buffer for storing the low speed universal data are packeted at the release timing. At this time, when the universal data stored in the buffer are less than the predetermined length of payload data, a stuffing function of a header part of the packet is used to compensate for the data to output the packet. Thus, the release timing cycle is controlled to reduce a multiplex delay. Moreover, the rearmost part of the burst data is detected, and the detected time is used as a release timing to prevent a multiplex delay of a void interval between two burst data.

11 Claims, 6 Drawing Sheets

FIXED LENGTH PACKET MULTIPLEXER OF UNIVERSAL DATA WITH BURST CHARACTERISTIC AT LOW SPEED

BACKGROUND OF THE INVENTION

The present invention relates to a fixed length packet multiplexer of universal data having a burst characteristic along with image coded data or audio coded data at a low speed (1.2 to 19.2 kbps).

DESCRIPTION OF THE PRIOR ART

In a fixed length packet multiplex transmitting of universal data along with image coded data or audio coded data at a low speed, for example, in a case of a MPEG-2 (ISO/IEC 13818-1) system, in general, data (band: 1.5 to 15 Mbps) of a MPEG-2 video (ISO/IEC 13818-2) system as image coded data are employed, or data (band: 64 to 384 kbps) of a MPEG-1 audio (ISO/IEC 11172-3) system as audio coded data are used. The image coded data or the audio coded data are transmitted at a relatively high speed, and packeting does not cause much delay even when a packet length is relatively large. Hence, the packet length is set to a relatively large value such as 188 bytes=4 bytes of a header+184 bytes of a payload.

Figure 1:
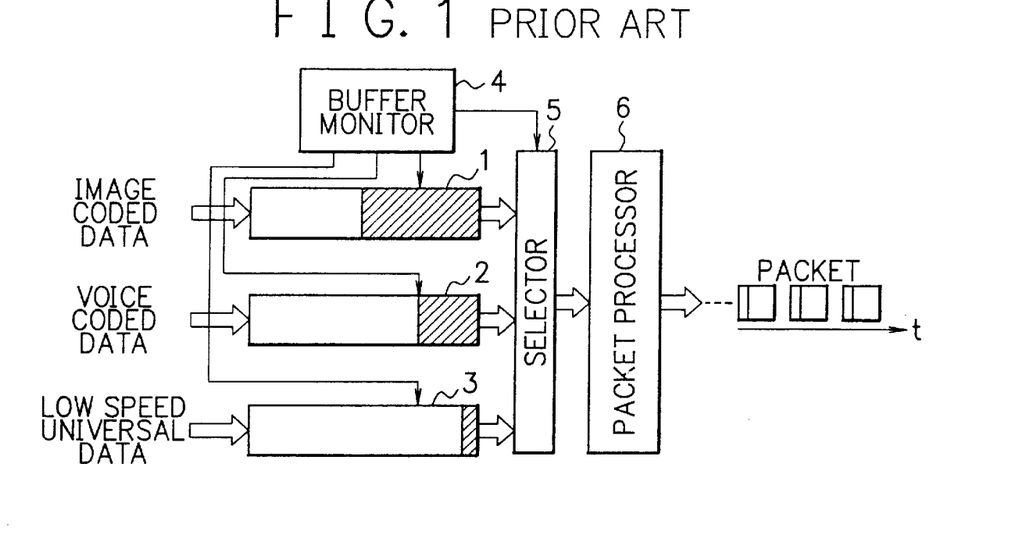
FIG. 1 is a block diagram of a conventional fixed length packet multiplexer of low speed universal data along with image coded data or audio coded data.
Figure 2:
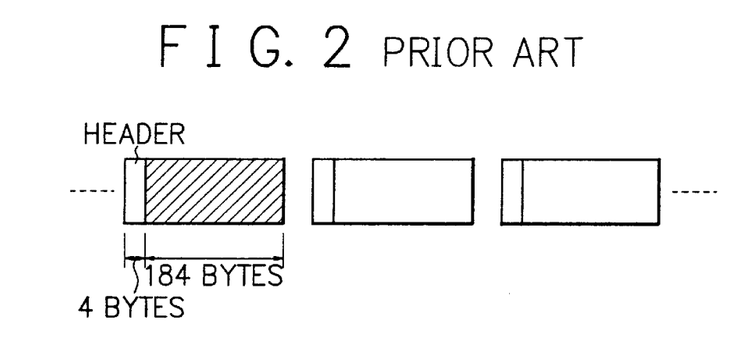
FIG. 2 is a schematic view showing a format of a fixed length packet formed in the conventional packet multiplexer shown in FIG. 1.

When data are transmitted in a fixed length packet in a conventional system, the data are input to a multiplex buffer, and, when a predetermined length of payload data of the aforementioned relatively large value are stored, the data are packeted and then transmitted. FIG. 1 illustrates a conventional fixed length packet multiplexer of universal data along with image coded data or audio coded data. In FIG. 1, image coded data, audio coded data and low speed universal data are input to respective exclusive multiplex buffers 1, 2 and 3. A buffer monitor 4 monitors whether or not each multiplex buffer 1, 2 or 3 stores the predetermined length of payload data. The time when each multiplex buffer 1, 2 or 3 stores the predetermined length of payload data is determined as a packet formable time (called "a release timing" later). The buffer monitor 4 allows a selector 5 to select the multiplex buffers 1, 2 and 3 in order of the attainment to their release timing. A packet processor 6 adds a header to the predetermined length of payload data to output the formed packet, as shown in FIG. 2. When the release timing of any multiplex buffers 1, 2 and 3 are equal, their packet processings are carried out in order of the lower input speed of the data supplied to the multiplex buffers 1, 2 and 3.

Figure 3:
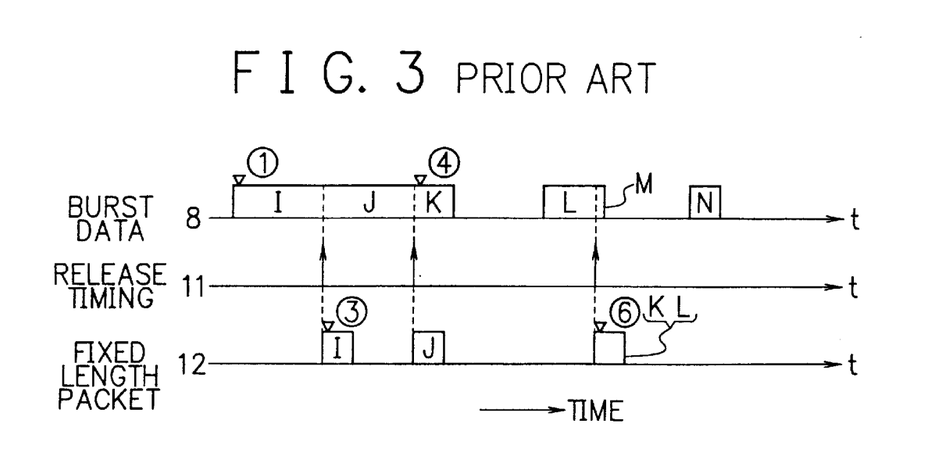
FIG. 3 is a timing chart showing relationships between input burst data, a release timing and a fixed length packet formation in packeting of low speed universal data having a burst characteristic in the conventional packet multiplexer shown in FIG. 1.

FIG. 3 shows a timing chart of input burst data, a release timing and a fixed length packet formation. The time when the burst data of the predetermined length of payload are stored in the multiplex buffer becomes the release timing, and the packet is formed at this release timing.

When a packet multiplex transmission is performed in a fixed length packet with the universal data along with the image coded data or the audio coded data at a low speed, the image and the audio are regarded as important, and the image coded data or the audio coded data are transmitted at a high speed. The packet length is set to the relatively large value.

In the conventional fixed length packet multiplexer, when the universal data are transmitted in a fixed length packet at a low speed, the low speed universal data are input to the multiplex buffer, and, when the predetermined length of payload data of the relatively large value is stored in the multiplex buffer, the packet is formed at the release timing and is output. In this system, two problems occur in the packet multiplexing. First, the universal data are transmitted at a low speed, and no packet is formed and transmitted before the predetermined length of payload data are stored in the multiplex buffer. As a result, a multiplex delay turns out large. Second, as shown in FIG. 3, when the burst universal data of low speed are input, the rearmost part of the burst data is packeted along with the head part of the following input burst data unless the length of the burst data is a multiple of an integral number of the predetermined length of payload data. Hence, a delay can be caused by a period with no data input between the two burst data.

SUMMARY OF THE INVENTION

It is therefore an object of the present invention to provide a fixed length packet multiplexer in view of the aforementioned problems of the prior art, which is capable of reducing a transmission delay of low speed universal data having a burst characteristic in a fixed length packet multiplex transmission of different data with different speeds and large speed differences.

In accordance with one aspect of the present invention, there is provided a fixed length packet multiplexer of low speed universal data having a burst characteristic, comprising means for detecting a momentary velocity (i,e. the instantaneous transmission speed) of burst data of the low speed universal data having the burst characteristic; means for periodically generating a release timing inversely proportional to the momentary velocity; means for producing a fixed length packet carrying the burst data on a payload at the release timing; and multiplex buffer means for storing the burst data of a predetermined length of payload of the packet.

In accordance with another aspect of the present invention, there is provided a fixed length packet multiplexer of low speed universal data having a burst characteristic, comprising means for detecting a rearmost part of burst data of the low speed universal data having the burst characteristic; means for detecting a momentary velocity of the burst data; means for periodically generating a release timing inversely proportional to the momentary velocity; means for producing a fixed length packet carrying the burst data on a payload at either the release timing or a timing when the rearmost part of the burst data is detected; and multiplex buffer means for storing the burst data of a predetermined length of payload of the packet.

In a fixed length packet multiplexer of the present invention, a transmission velocity of the low speed universal data is in a range of 1.2 to 19.2 kbps.

Preferably, the momentary velocity detecting means includes a first counter for counting up burst clocks which are input with the burst data and correspond thereto; a cycle pulse generator for generating a pulse on an enough long cycle so as to measure the momentary velocity of the burst data; a delay for delaying the pulse generated by the cycle pulse generator to output the delayed pulse to a clear terminal of the first counter; and a first latch for latching a counted value of the cleared first counter as a time cycle control signal to output the time cycle control signal in synchronism with the pulse generated by the cycle pulse generator.

Further, preferably, the rearmost part detecting means includes a second counter for counting up burst clocks which are input with the burst data and correspond thereto; a latch pulse generator for generating a pulse on an enough short cycle than a void interval between the two burst data so as to latch a counted value of the second counter by the pulse generated by the latch pulse generator; a comparator for comparing a present counted value latched with a previous counted value latched to output either a low level signal or a high level signal when the present counted value is either equal or not equal to the previous counted value; and a trailing edge detector to output a pulse as a burst data end signal when the signal is changed from the high level to the low level, that is, the rearmost part of the burst data is detected.

In a fixed length packet multiplexer of the present invention, the release timing generating means can include a release timing generating section which inputs a periodic pulse inversely proportional to a velocity as a time cycle control signal and outputs a pulse on either a quick cycle or a slow cycle when the velocity is either low or high, resulting in permitting a multiplex delay to be constant independent to the velocity of the burst data and outputting the burst data end signal and the periodic pulse.

Figure 4:
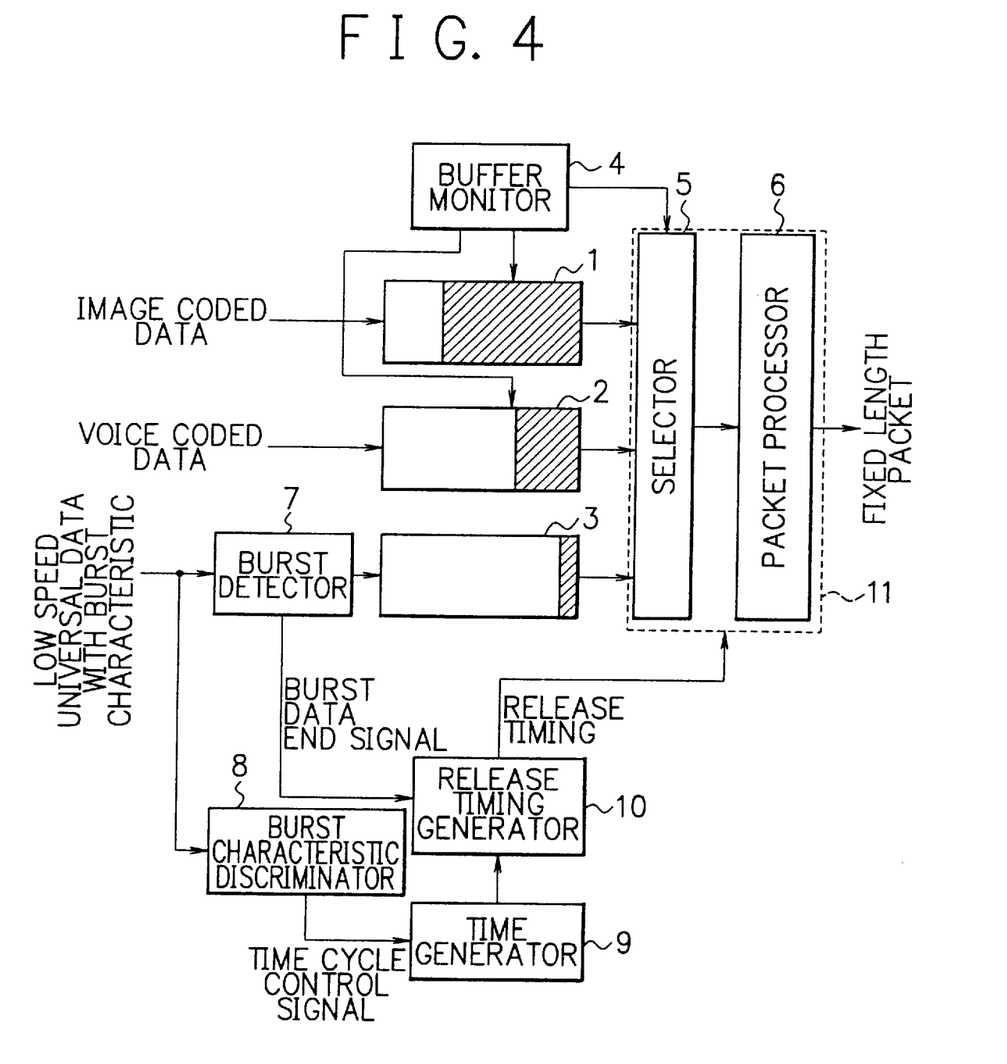
FIG. 4 is a block diagram of a fixed length packet multiplexer of low speed universal data having a burst characteristic according to a first embodiment of the present invention.

According to the present invention, in a packet processor, a packet formable time (release timing) is not determined to the time when a predetermined length of payload data are stored in a multiplex buffer like the conventional case. However, as shown in FIG. 4, a periodic release timing is voluntarily given to a multiplex part from a time generator, and the universal data stored in a buffer for storing the low speed universal data are packeted at the release timing. At this time, when the universal data stored in the buffer are less than the predetermined length of payload data, a stuffing function of a header part of the packet is used to compensate for the data to output the packet. As a result, the release timing cycle is controlled to reduce a multiplex delay. Moreover, the rearmost part of the burst data is detected, and this detected time is used as a release timing. Hence, a multiplex delay of a void interval between two burst data in the conventional case can be prevented.

Figure 5:
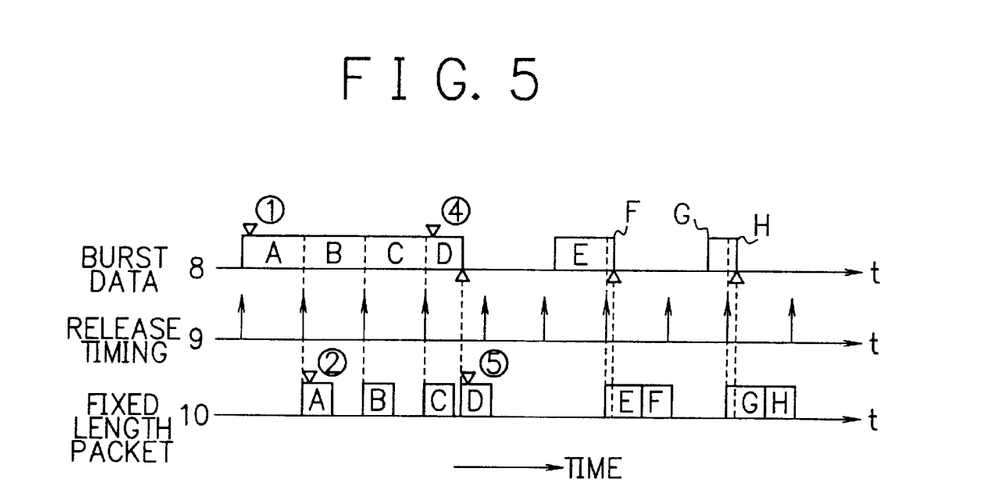
FIG. 5 is a timing chart showing relationships between input burst data, a release timing and a fixed length packet formation in packeting of low speed universal data having a burst characteristic in the packet multiplexer shown in FIG. 4.

As shown in FIG. 5 exhibiting relationships between input burst data, a release timing and a fixed length packet formation in packeting of the universal data, the release timing is generated periodically independent of the data stored in the buffer different from the conventional case.

In the conventional case, the release timing is set to the time when the predetermined length of payload data are stored in the multiplex buffer, and, when the data have the burst characteristic, there can occur a delay of the time with no input data in the multiplex buffer. According to the present invention, the release timing is generated periodically, and such a delay does not occur.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Referring now to the drawings, there is shown in FIG. 4 a fixed length packet multiplexer of low speed universal data having a burst characteristic according to a first embodiment of the present invention. As shown in FIG. 4, the present system is applied to a packeting section of the low speed universal data having the burst characteristic in multiplexing image coded data, audio coded data and the low speed universal data.

In FIG. 4, image coded data and audio coded data are input to respective multiplex buffers 1 and 2, and a buffer monitor 4 monitors whether or not each multiplex buffer 1 or 2 stores a predetermined length of payload data. The time when each multiplex buffer 1 or 2 stores the predetermined length of payload data is determined as a release timing for a packet forming. On the other hand, low speed universal data having a burst characteristic is stored into a buffer 3 via a burst detector 7 for detecting the rearmost part of one burst in the burst data. Further, simultaneously, the low speed universal data are directly sent to a burst characteristic discriminator 8 for detecting a momentary velocity.

Figure 6:
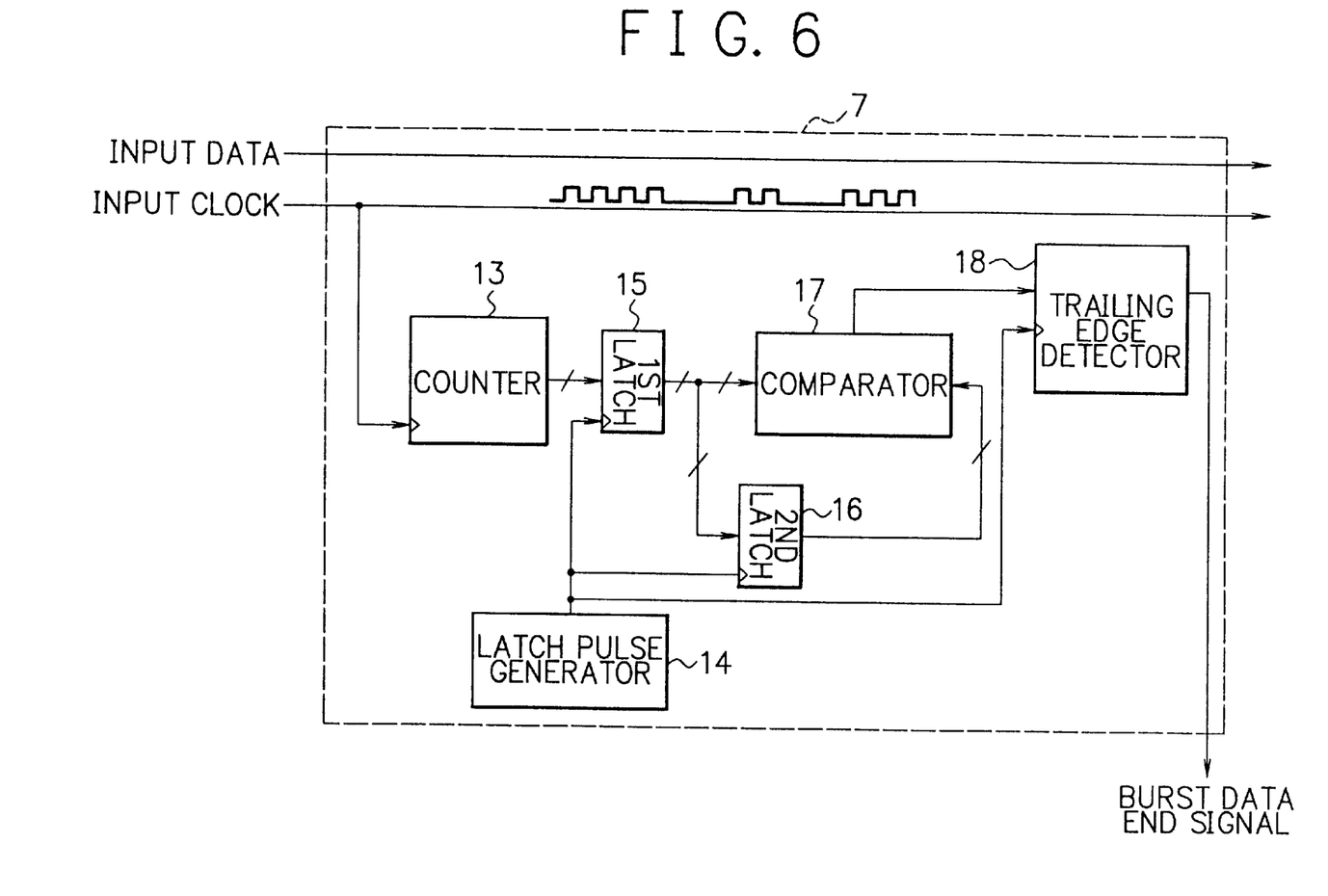
FIG. 6 is a block diagram of a burst detector shown in FIG. 4.

When detecting the rearmost part of one burst, the burst detector 7 outputs its burst data end signal to a release timing generator 10. FIG. 6 shows one embodiment of the burst detector 7. In this embodiment, it is assumed that the burst data are input to the burst detector 7 along with a burst clock corresponding to the burst data. In FIG. 6, a counter 13 counts up the input burst clocks to supply a counted value to a first latch 15. A latch pulse generator 14 periodically sends a pulse to the first latch 15, a second latch 16 and a trailing edge detector 18 on an enough short cycle than a void interval between two burst data. The first latch 15 latches the counted value of the counter 13 by the pulse sent from the latch pulse generator 14 and outputs the latched value to the second latch 16 and a comparator 17. While the first latch 15 latches the present counted value of the counter 13, the second latch 16 latches the previous counted value sent from the first latch 15. The comparator 17 receives the present counted value latched by the first latch 15 and the previous counted value latched by the second latch 16 and compares the two counted values. When the present counted value is equal to the previous counted value, the comparator 17 outputs a low level signal to the trailing edge detector 18, and, when the present counted value is not equal to the previous counted value, the comparator 17 outputs a high level signal. When the signal is changed from the high level to the low level, that is, the rearmost part of the burst data is detected, the trailing edge detector 18 outputs a pulse as a burst data end signal.

Figure 7:
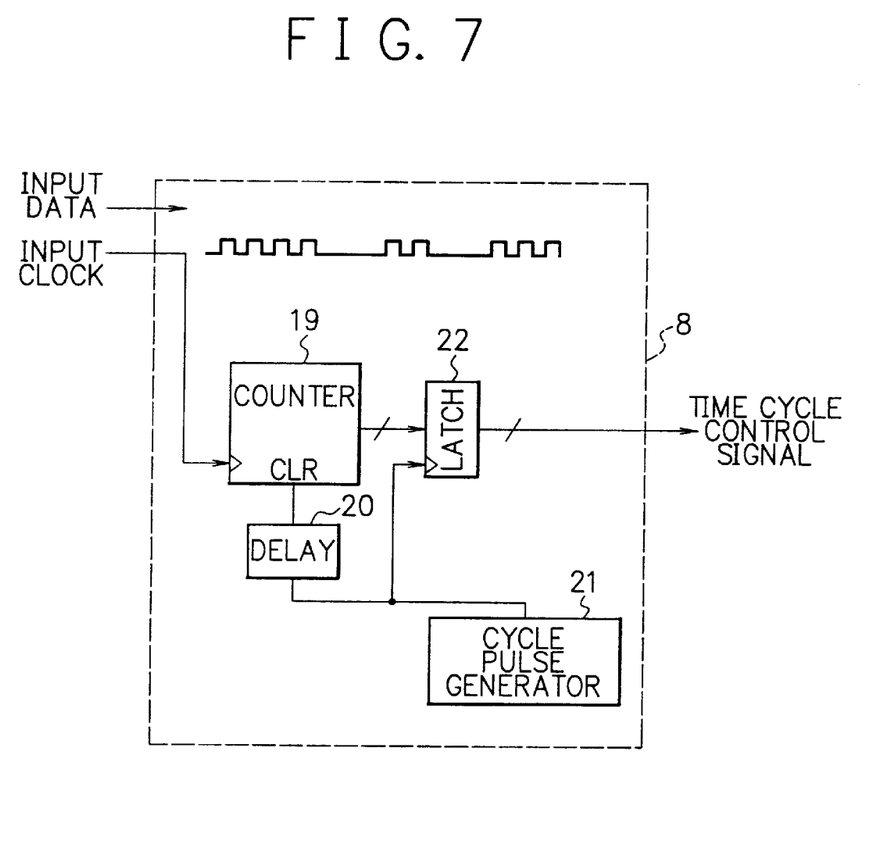
FIG. 7 is a block diagram of a burst characteristic discriminator shown in FIG. 4.

The burst characteristic discriminator 8 detects the momentary velocity (i,e. the instantaneous transmission speed) of the burst data and outputs a time cycle control signal for generating a pulse on a cycle inversely proportional to the momentary velocity to a time generator 9. FIG. 7 illustrates one embodiment of the burst characteristic discriminator 8. In the same manner as the burst detector 7 described above, it is assumed that the burst data are input to the burst characteristic discriminator 8 along with the burst clock corresponding to the burst data. In FIG. 7, a counter 19 counts up input burst clocks and outputs a counted value to a latch 22. A cycle pulse generator 21 outputs a pulse to the latch 22 and a clear terminal CLR of the counter 19 via a delay 20 on an enough long cycle so as to measure the momentary velocity of the burst data. The latch 22 latches the counted value of the counter 19 by the pulse sent from the cycle pulse generator 21. After the latching, the counter 19 clears the counted value by applying the pulse sent from the cycle pulse generator 21 to its clear terminal CLR via the delay 20. As a result, a data average velocity of the pulse to the pulse interval becomes a value obtained by dividing the counted value latched by the latch 22 by the cycle of the pulse. Hence, the counted value is proportional to the velocity, and the latch 22 outputs velocity information as a time cycle control signal.

The time generator 9 outputs a periodic pulse to the release timing generator 10 on a cycle inversely proportional to the time cycle control signal, i.e. the velocity. When the velocity is low, the time generator 9 outputs the pulse on a quick cycle, and, when the velocity is high, the time generator 9 outputs the pulse on a slow cycle. Thus, a multiplex delay turns out constant independent of the velocity of the burst data. The release timing generator 10 outputs the burst data end signal sent from the burst detector 7 and the periodic pulse sent from the time generator 9 as a release timing to a multiplex part 11 including a selector 5 and a packet processor 6. In the multiplex part 11, the data stored in the buffer 3 are packeted at the release timing sent from the release timing generator 10 and outputs a fixed length packet on a transmission line. When the buffer 3 stores less data than the predetermined length of payload data at the release timing, the packet processor 6 produces a fixed length packet using a stuffing function of a header part of the packet.

A packeting of burst data to produce a fixed length packet at a release timing will be described compared with the conventional case with reference to FIG. 5 and FIG. 3. The time generator 9 gives solid line arrows of the release timing, and the burst detector 7 gives broken line arrows. As clear from FIG. 5 and FIG. 3, while part $\hat{1}$ of the burst data is packeted at time $\hat{3}$ in the conventional case, part $\hat{1}$ is packeted at time $\hat{2}$ earlier than the conventional case in the present invention. While the packeting is executed after the predetermined length of packet data are stored in the conventional case, the packeting is implemented at a periodic release timing in the present invention. Similarly, part $\hat{4}$ is packeted at time $\hat{6}$ in the conventional case, part $\hat{4}$ is packeted at time $\hat{5}$ much earlier than the conventional case in the present invention. This is why the detecting time of the rearmost part of one burst of the burst data is used as the release timing in the present invention.

Next, a fixed length packet multiplexer of low speed universal data having a burst characteristic according to a second embodiment of the present invention will be described in connection with FIG. 8. It is readily understood that the present invention can be applied to a system for performing a packet multiplex of only low speed universal data in addition to the packet multiplex of the low speed universal data having the burst characteristic along with the image coded data or the audio coded data.

Figure 8:
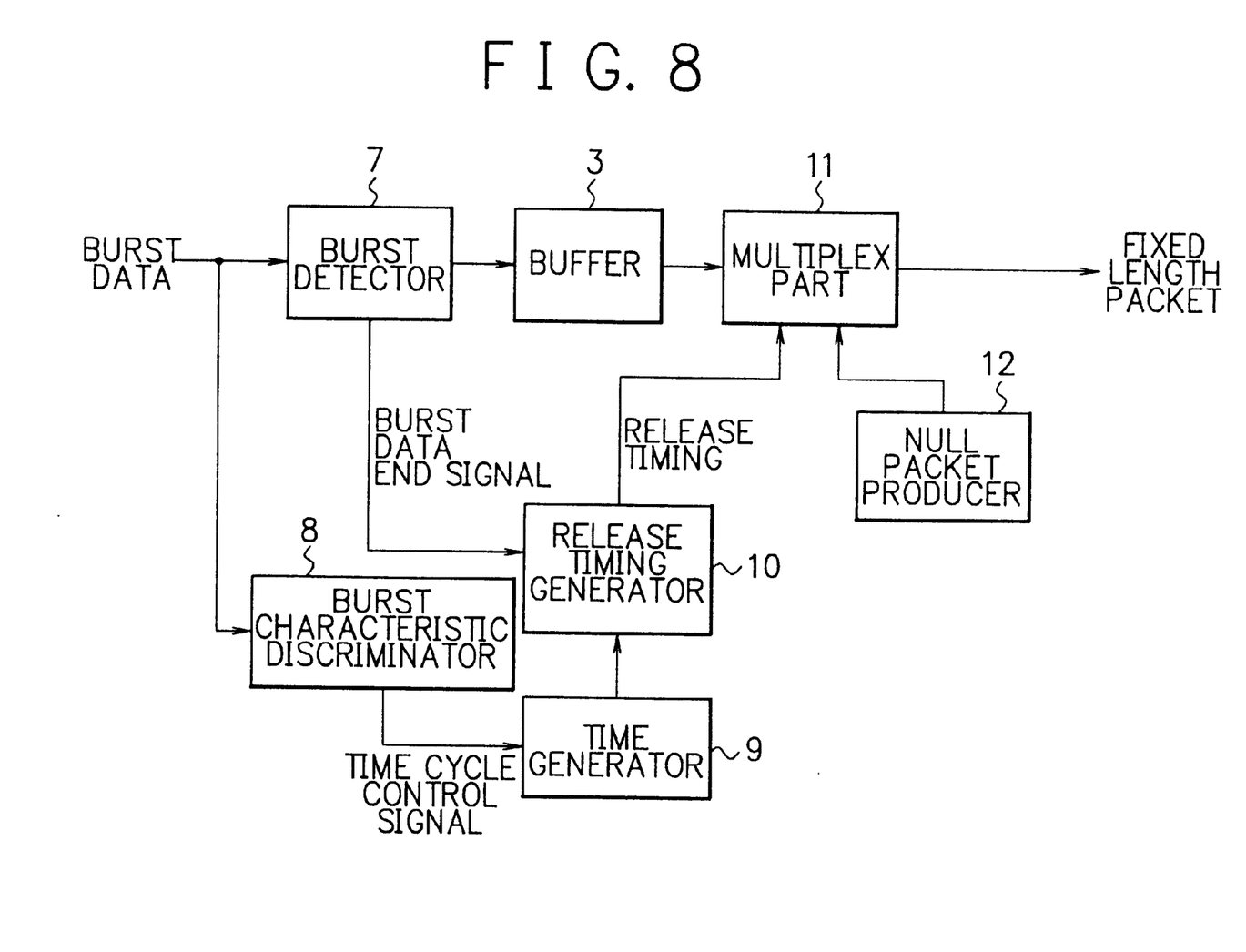
FIG. 8 is a block diagram of a fixed length packet multiplexer to be used in a system for performing a packet multiplex of only low speed universal data having a burst characteristic according to a second embodiment of the present invention.

FIG. 8 shows a fixed length packet multiplexer to be used in a system for performing a packet multiplex of only low speed universal data having a burst characteristic according to a second embodiment of the present invention. In this embodiment, the construction is similar to the first embodiment shown in FIG. 4 except that the first and second multiplex buffers 1 and 2 and a buffer monitor 4 are omitted and a null packet producer 12 is added. In this case, in the multiplex part 11, time slot parts of the packets carrying the image coded data and the audio coded data formed in the first embodiment, that is, the time slot parts of null packets are filled up by null packets supplied from the null packet producer 12.

As described above, in a fixed length packet multiplexer of low speed universal data having a burst characteristic of the present invention, the increase of a multiplex delay owing to a low velocity of input data and a multiplex delay due to data having a burst characteristic can be prevented, resulting in reducing the multiplex delays.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A fixed length packet multiplexer of low speed universal data having a burst characteristic, comprising:
    means for detecting an instantaneous transmission speed of burst data of the low speed universal data having the burst characteristic;
    means for periodically generating a release timing inversely proportional to the instantaneous transmission speed;
    means for producing a fixed length packet carrying the burst data on a payload at the release timing; and
    multiplex buffer means for storing the burst data of a predetermined length of payload of the packet.

2. A fixed length packet multiplexer of claim 1, wherein a transmission speed of the low speed universal data is in a range of 1.2 to 19.2 kbps.

3. A fixed length packet multiplexer of claim 1, wherein the instantaneous transmission speed detecting means includes:
    a first counter for counting up burst clocks which are input with the burst data and correspond thereto;
    a cycle pulse generator for generating a pulse on an enough long cycle so as to measure the instantaneous transmission speed of the burst data;
    a delay for delaying the pulse generated by the cycle pulse generator to output the delayed pulse to a clear terminal of the first counter; and
    a first latch for latching a counted value of the cleared first counter as a time cycle control signal to output the time cycle control signal in synchronism with the pulse generated by the cycle pulse generator.

4. A fixed length packet multiplexer of claim 1, wherein the release timing generating means includes a release timing generating section which inputs a periodic pulse inversely proportional to a transmission speed as a time cycle control signal and outputs a pulse on either a quick cycle or a slow cycle when the transmission speed is either low or high, resulting in permitting a multiplex delay to be constant independent to the transmission speed of the burst data and outputting the burst data end signal and the periodic pulse.

5. A fixed length packet multiplexer of claim 1, further comprising a null packet producer for producing a null packet to fill up a time slot part of a null packet.

6. A fixed length packet multiplexer of low speed universal data having a burst characteristic, comprising:
   means for detecting a rearmost part of burst data of the low speed universal data having the burst characteristic;
   means for detecting an instantaneous transmission speed of the burst data;
   means for periodically generating a release timing inversely proportional to the instantaneous transmission speed;
   means for producing a fixed length packet carrying the burst data on a payload at either the release timing or a timing when the rearmost part of the burst data is detected; and
   multiplex buffer means for storing the burst data of a predetermined length of payload of the packet.

7. A fixed length packet multiplexer of claim 6, wherein a transmission speed of the low speed universal data is in a range of 1.2 to 19.2 kbps.

8. A fixed length packet multiplexer of claim 6, wherein the instantaneous transmission detecting means includes:
   a first counter for counting up burst clocks which are input with the burst data and correspond thereto;
   a cycle pulse generator for generating a pulse on an enough long cycle so as to measure the instantaneous transmission of the burst data;
   a delay for delaying the pulse generated by the cycle pulse generator to output the delayed pulse to a clear terminal of the first counter; and
   a first latch for latching a counted value of the cleared first counter as a time cycle control signal to output the time cycle control signal in synchronism with the pulse generated by the cycle pulse generator.

9. A fixed length packet multiplexer of claim 6, wherein the rearmost part detecting means includes:
   a second counter for counting up burst clocks which are input with the burst data and correspond thereto;
   a latch pulse generator for generating a pulse on an enough short cycle than a void interval between the two burst data so as to latch a counted value of the second counter by the pulse generated by the latch pulse generator;
   a comparator for comparing a present counted value latched with a previous counted value latched to output either a low level signal or a high level signal when the present counted value is either equal or not equal to the previous counted value; and
   a trailing edge detector to output a pulse as a burst data end signal when the signal is changed from the high level to the low level, that is, the rearmost part of the burst data is detected.

10. A fixed length packet multiplexer of claim 6, wherein the release timing generating means includes a release timing generating section which inputs a periodic pulse inversely proportional to a transmission speed as a time cycle control signal and outputs a pulse on either a quick cycle or a slow cycle when the transmission speed is either low or high, resulting in permitting a multiplex delay to be constant independent to the transmission speed of the burst data and outputting the burst data end signal and the periodic pulse.

11. A fixed length packet multiplexer of claim 6, further comprising a null packet producer for producing a null packet to fill up a time slot part of a null packet.

* * * * *